United States Patent [19]

Crews et al.

[11] Patent Number: 5,254,665

[45] Date of Patent: Oct. 19, 1993

[54] AMMELINE-MELAMINE-FORMALDE-HYDE RESINS (AMFR) AND METHOD OF PREPARATION

[75] Inventors: George M. Crews, Gonzales; Shen Ji, Donaldsonville, both of La.; Charles U. Pittman, Jr., Tuscaloosa, Ala.; Ruicheng Ran, Starkville, Miss.

[73] Assignee: Melamine Chemicals, Inc., Donaldsonville, La.

[21] Appl. No.: 933,815

[22] Filed: Aug. 24, 1992

[51] Int. Cl.$^5$ .............................................. C08G 12/30
[52] U.S. Cl. .................................... 528/254; 528/230; 528/232; 528/247; 528/266; 525/472; 525/509; 525/518; 525/519; 525/540; 524/284
[58] Field of Search ............... 528/230, 232, 247, 254, 528/266; 525/472, 509, 518, 519, 540; 524/284

[56] References Cited

U.S. PATENT DOCUMENTS

| | | | |
|---|---|---|---|
| 2,863,869 | 12/1958 | Elmer et al. | 528/254 |
| 3,496,176 | 2/1970 | Kennedy | 544/203 |
| 3,496,177 | 2/1970 | Hoogendonk et al. | 544/203 |
| 3,627,719 | 12/1971 | Sellet | 524/315 |
| 4,200,729 | 4/1980 | Calbo | 525/398 |
| 4,663,387 | 5/1987 | Lahalih et al. | 524/843 |
| 4,797,433 | 1/1989 | Lahalih et al. | 524/3 |
| 5,120,821 | 6/1992 | Crews et al. | 528/230 |

Primary Examiner—Samuel A. Acquah
Attorney, Agent, or Firm—Breiner & Breiner

[57] ABSTRACT

Ammeline-melamine-formaldehyde resins (AMFR) containing from 5-100% ammeline were synthesized by the polymerization of the sodium salt of ammeline, which must be made in advance, melamine, and formaldehyde in basic medium (pH=9.2-10.0). In this copolymerization, it is possible to make uniform random AMFR resins with any mole ratio of ammeline salt to melamine. Preferably the AMFR resin will contain from 5-10% ammeline. As an "ionomer" or a "polyelectrolyte," both the solid and solution properties of these resins (such as melting temperature, solubility, solution stability, etc.) depended directly on the mole ratio of ammeline to melamine and formaldehyde, and/or on the pH value of the medium in which the AMFR resin was present. The pH value controlled the ammeline rings/ammeline's salt groups and also the ratio of unprotonated to protonated amino groups on both the melamine and ammeline rings.

These polymers have different solubilities, cloud points and solution lifetimes (which depend on pH) than melamine-formaldehyde resins. AMFR systems containing from 5-10% ammeline are more flexible than MFR resins and exhibit different adhesion properties than MFR resins.

10 Claims, No Drawings

AMMELINE-MELAMINE-FORMALDEHYDE RESINS (AMFR) AND METHOD OF PREPARATION

FIELD OF THE INVENTION

This invention relates to ammeline-melamine-formaldehyde resins (AMFR) and to a process for the production of such resins. More particularly, the invention relates to a process for the production of AMFR resins wherein the sodium salt of ammeline is first produced and thereafter the ammeline salt reacted with melamine and formaldehyde to produce the AMFR resins. Resins produced according to the invention have improved flexibility with respect to melamine-formaldehyde resins and, additionally, have improved adherence characteristics for certain applications relative to melamine-formaldehyde resins.

BACKGROUND OF THE INVENTION

Ammeline is prepared conveniently by hydrolysis of melamine in acids or bases. However, ammeline has not been widely used in organic syntheses or polymerization due to its insolubility in water and organic solvents. The insolubility of ammeline in aqueous formaldehyde solutions has been a major problem with respect to the preparation of melamine-formaldehyde resins and, therefore, melamine-formaldehyde resins have conventionally been made using only pure melamine. More recently, in George M. Crews et al, U.S. Pat. No. 5,120,821, a process is described for the production of melamine-formaldehyde resins utilizing melamine containing the impurities of the melamine manufacturing process including minor amounts of ammelide, ammeline, ureidomelamine, melem and melam. In the process of the '821 patent the pH of the reaction charge is controlled within a range of from about 8 to 10 during processing of the resins. The process produces acceptable melamine-formaldehyde resins containing ammeline in amounts up to about 0.3% as well as other impurities such as ammelide, ureidomelamine, melem and melam in amounts up to about a total of 4%. The melamine-formaldehyde resins produced by the aforesaid process are useful in most all commercial applications.

SUMMARY OF THE INVENTION

It has now been found according to the present invention that ammeline-melamine-formaldehyde resins containing from about 5 to 10% of ammeline can be provided having superior flexibility and adhesive characteristics for certain applications in comparison to melamine-formaldehyde resins of a similar composition. The manufacture of the AMFR resins according to the present invention has been made possible due to the discovery that if the sodium or other alkali or alkaline earth metal salt of ammeline are formed, the salt will be soluble in water. Additionally, the lowering of the pH of the solution due to the presence of the acidic —OH group during resin formation does not occur. Since the ammeline salt is soluble in water, it can be used as a resin starting material without detriment. The solubility characteristics of the resin can be illustrated as follows:

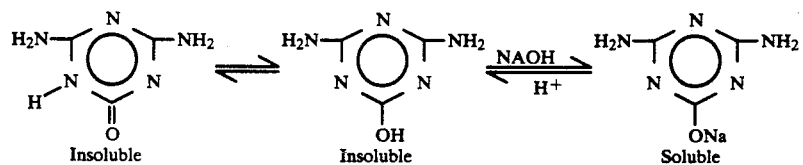

In preparing resins, the sodium salt of ammeline is mixed with melamine and formaldehyde and polymerized. The resultant AMFR resin is a polymer containing salt groups. The formulation of resins containing from 5 to 10% ammeline is illustrated as follows:

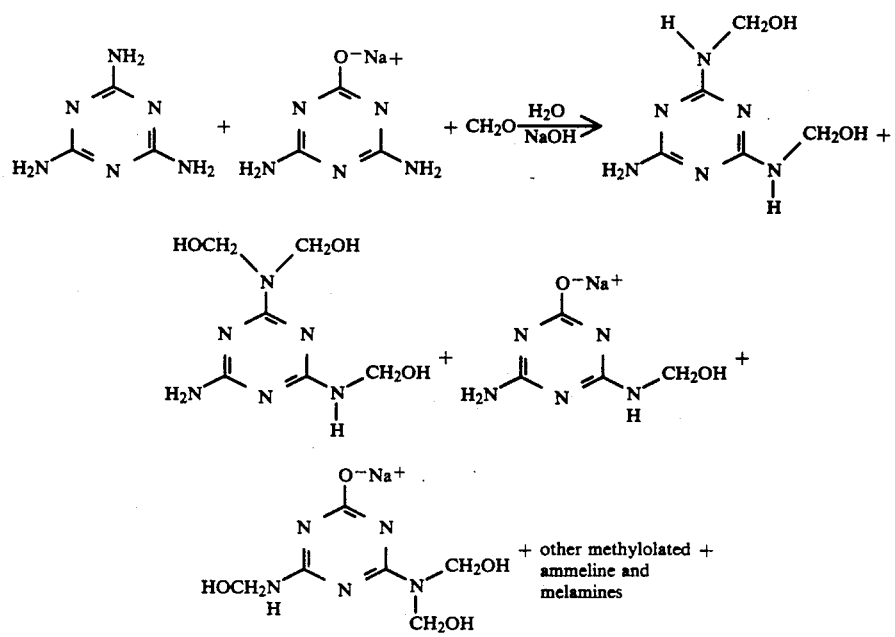

-continued

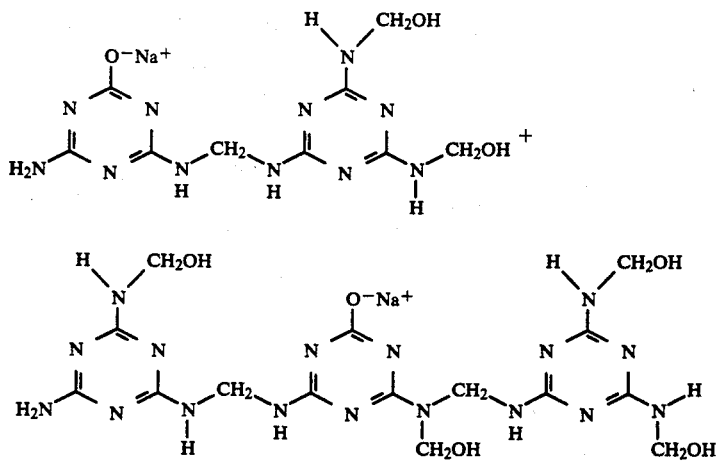

Surprisingly, these resins have superior flexibility and, additionally, have good adhesive characteristics relative to the melamine-formaldehyde resins without detriment to the other known advantageous properties of melamine-formaldehyde resins.

It has been further found that the addition of minor amounts of polyvinyl alcohol and citric acid will increase the stability of the resin and water resistance of the laminates prepared from such resins.

Although the best commercial AMFR products contain from 5-10% ammeline, the process permits the preparation of formaldehyde resins containing any mole ratio of ammeline salt to melamine. Accordingly, ammeline-melamine-formaldehyde resins (AMFR) are synthesized containing from 5-100% ammeline by the polymerization of the sodium salt of ammeline, which must be made in advance, melamine, and formaldehyde in basic medium (pH=9.2-10.0). In this copolymerization, it is possible to make uniform random AMFR resins with any mole ratio of ammeline salt to melamine. As an "ionomer" or a "polyelectrolyte," both the solid and solution properties of these resins (such as melting temperature, solubility, solution stability, etc.) depend directly on the mole ratio of ammeline to melamine and formaldehyde, and/or on the pH value of the medium in which the AMFR resin was present. The pH value controls the ammeline rings/ammeline's salt groups and also the ratio of unprotonated to protonated amino groups on both the melamine and ammeline rings.

These polymers have different solubilities, cloud points and solution lifetimes (which depend on pH) than melamine-formaldehyde resins (MFR). AMFR systems having from 5-10% ammeline are more flexible than MFR resins and exhibit different adhesion properties than MFR resins and are the preferred AMFR resins.

DETAILED DESCRIPTION OF THE PREFERRED EMBODIMENT

1. Preparation of Melamine-Ammeline-Formaldehyde Resin (AMFR) Containing 3%-10% of Ammeline 1-1. Preparation of the sodium salt of ammeline Ammeline (6.35 g, 0.05 mol) was mixed with sodium hydroxide (2 g, 0.05 mol) in 15 mL of water and heated to form a clear solution (pH-10.25). The sodium salt of ammeline (white needle crystals) precipitated upon cooling the solution to room temperature.

1-2. Preparation of AMFR containing 5% ammeline

Method 1

At room temperature, the solution of the ammeline salt (0.05 mol) prepared above was added to a mixture of melamine (119.7 g, 0.95 mol), PVA (0.4 g) and aqueous formaldehyde (37%, 239 g, 2.95 mol). The $F/NH_2$ mole ratio was 1:1, (the $NH_2$ groups being the sum total of the groups of ammeline and melamine). At this time, the pH of this reaction mixture (slurry) was 10.0-10.2, and no pH adjustments were made during the entire reaction period. After heating about 10 minutes, the temperature of reaction mixture was 80° C.; the reaction mixture became clear. The temperature was held at 90° C. and the pH of reaction solution slowly decreased. The reaction was considered to be complete when the water tolerance reached 150-160 and the viscosity reached 120-150 (mpa.s) as determined at 25° C. (by a Brookfield Viscosimeter, Model LV). The cook time was about 140-160 minutes. After the reaction was completed, 40 mL of alcohol (10% of total reaction volume) was added and the pH of resin was adjusted to 8.5 with citric acid (about 1 4 g). The resin was stored at room temperature.

Method 2:

Same as Method 1, but at the end of the reaction the pH was adjusted to pH-9.2 at 90° C.

2. Lamination

Lamination was carried out with the materials and conditions as follows:

Material: General type paper (Nekoosa bond), 5 sheets
Temperature: 270°/260° F.
Pressure: 9 tons on 4.5×5.5 inch specimen
Cure Time: 12 min.-15 min.

3. Flexibility Test

The laminate was tested for flexibility as follows:

Test Specimens: $7.2 \times 3.0 \times 0.052$ cm$^3$, bonded, 0.75-0.8 g/cm$^3$
Temperature: (a) 25° C.; (b) 110° C.
Determination of Flexibility: (F) (Flexing Rate—2.0 mm/min.) $F-(Lo-L)/Lo \times 100\%$

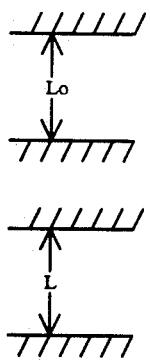

4. Boiling Water Resistance Test

The laminate was tested for boiling water resistance as follows:

(a) Approximately 50 mL of boiling water was poured on the surface of the specimen.
(b) The specimen was submerged in boiling water for 30 minutes.
(c) The specimen was wiped, dried and kept at room temperature for 24 hours.
(d) Observations made in surface texture: cracks, discoloration, crazing, whitening, blisters, delamination
(e) Key of results
  NE: no effect
  SE: slight effect
  E: effect

RESULTS

1. AMFR Resin

| | |
|---|---|
| Mole ratio: | MN/AN - 0.95/0.05 |
| | F/NH$_2$ - 1.1 |
| pH of resin: | 9.0 |
| Water tolerance: | 150% |
| Viscosity: | 120 mpa · s/25° C. |
| | 70 mpa · s/25° C. (after adding alcohol) |
| | 75 mpa · s/25° C. (after adding acid) |
| Dry extract: | (1 g/1 h/120° C.) 37% |
| Shelf time: | >30 days |

2. Laminate

| | |
|---|---|
| Thickness: | 0.021 inch |
| Bonded: | 0.76 g/cm$^3$ |
| Boiling Test: | No effect |
| Flexibility: | (specimens, 7.2 × 3.0 × 0.05 cm$^3$) |
| | F-47% (compared to Melamine resin F-17%) |

MN = melamine
AN = Ammeline
F = formaldehyde

3. Effect of ammeline content (%) on water resistance of laminates

| RXN. Time (Min.) | Ammeline (%) | PVA (%) | Boiling Water Test | Flexibility (%) |
|---|---|---|---|---|
| 12 | 0 | 0 | NE | 17 |
| 9-2 | 3 | 0.1 | NE | 22 |
| 14 | 5 | 0.1 | NE | 47 |
| 20 | 10 | 0.1 | Blisters | 36 |

4. Effect of citric acid on water resistance of laminates

Citric acid was added to partially neutralize ammeline salt ions bonded with the resin at the end of the reaction or the start of the reaction when the temperature reached to 90° C. Such modification improved the water resistance of the laminates. The results are shown below:

| RXN. Time (Min.) | Ammeline (%) | PVA (%) | Citric Acid (g)* | Boiling Water Test |
|---|---|---|---|---|
| 7-2 | 3 | 0.2 | 0 | Blisters |
| 9-1 | 3 | 0.1 | 0 | SE |
| 9-2 | 3 | 0.1 | 1.0 at end | NE |
| 17 | 3 | 0.1 | 0.9 at 90° C. | NE |

*The amount of citric acid was calculated for neutralization of about 40-50% ammeline.

The present invention, while being illustrated by the above examples, can include various modifications; Thus, although sodium salt is utilized in the above examples, it is possible to use any alkali or alkaline earth metal salt provided that the salt is soluble in water. Moreover, the conditions can be changed so long as the pH is controlled within the range of from about a pH of 8.0 to 10.5. Various other modifications can be made.

As will be apparent to one skilled in the art, various modifications can be made within the scope of the aforesaid description. Such modifications being within the ability of one skilled in the art form a part of the present invention and are embraced by the appended claims.

What is claimed:

1. Process for producing ammeline-melamine-formaldehyde resins comprising
  (a) providing ammeline in substantially pure form;
  (b) forming a water-soluble salt of ammeline;
  (c) mixing the water-soluble salt of ammeline with formaldehyde and melamine;
  (d) adjusting the pH of the mixture to within the range of from about 8 to 10 and polymerizing the mixture while maintaining the pH within the range of about 8 to 10.5.
2. The process of claim 1 wherein the water-soluble salt of ammeline is the sodium salt.
3. The process of claim 2 wherein the ammeline salt is present in an amount of from about 5 to 10 mol % and melamine is present at from about 95-90 mol %.
4. The process of claim 3 wherein the ratio of formaldehyde to the total ammeline and melamine is from about 1:1.5 to 3.0.
5. The process of claim 3 wherein the ratio of formaldehyde to the total ammeline and melamine is from about 1:2.2 to 3.0.
6. The process of claim 1 wherein from 0.1-0.22% polyvinyl chloride is added to the reaction mixture.
7. The process of claim 6 wherein the final polymer is stabilized by the addition of citric acid.
8. The polymer prepared by the process of any of claims 1-7.
9. A water-soluble salt of ammeline in substantially pure form.
10. A water-soluble sodium salt of ammeline in substantially pure form.

* * * * *